US010693287B2

(12) United States Patent
Bang-Andreasen

(10) Patent No.: US 10,693,287 B2
(45) Date of Patent: Jun. 23, 2020

(54) FOUNDATION INTERFACE DEVICE WITH CATHODE PROTECTION

(71) Applicant: Balmoral Comtec Limited, Loirston, Aberdeen (GB)

(72) Inventor: Henrik Bang-Andreasen, Bergen (NO)

(73) Assignee: Balmoral Comtec Limited, Loirston, Aberdeen (GB)

( * ) Notice: Subject to any disclaimer, the term of this patent is extended or adjusted under 35 U.S.C. 154(b) by 0 days.

(21) Appl. No.: 16/469,596

(22) PCT Filed: Dec. 20, 2017

(86) PCT No.: PCT/EP2017/083703
§ 371 (c)(1),
(2) Date: Jun. 13, 2019

(87) PCT Pub. No.: WO2018/115056
PCT Pub. Date: Jun. 28, 2018

(65) Prior Publication Data
US 2020/0014183 A1  Jan. 9, 2020

Related U.S. Application Data

(60) Provisional application No. 62/437,062, filed on Dec. 21, 2016.

(51) Int. Cl.
*F16L 1/12* (2006.01)
*H02G 3/22* (2006.01)
(Continued)

(52) U.S. Cl.
CPC ............... *H02G 3/22* (2013.01); *F16L 1/123* (2013.01); *F16L 5/00* (2013.01); *H01R 13/523* (2013.01); *H02G 1/10* (2013.01)

(58) Field of Classification Search
CPC ... H02G 3/22; H02G 1/10; F16L 1/123; F16L 5/00; H01R 13/523
See application file for complete search history.

(56) References Cited

U.S. PATENT DOCUMENTS 4,951,923 A * 8/1990 Couture ................. B65H 57/12
254/134.3 R
9,249,899 B2 * 2/2016 Bang-Andresen ....... H02G 1/10
(Continued)

FOREIGN PATENT DOCUMENTS

EP    2329174      4/2016
WO   86/00384     1/1986
(Continued)

OTHER PUBLICATIONS

PCT/EP2017/083703 International Search Report dated Apr. 5, 2018 (5 pages).
(Continued)

*Primary Examiner* — Benjamin F Fiorello
(74) *Attorney, Agent, or Firm* — SmithAmundsen LLC

(57) ABSTRACT

A foundation interface that avoids the problem of galvanic corrosion. According to one aspect, the invention provides a foundation interface device arranged to engage an opening in the wall of an offshore foundation or structure having walls made of a first metal. The interface device has teeth or arms arranged to engage the inside of the opening. The teeth or arms are provided with galvanic protection means. According to one aspect, the galvanic protection means comprises a non-metallic contact member arranged on the teeth or arms, where the non-metallic member is in contact with the inside of the opening. According to one aspect the non-metallic contact member is made of a ceramic material.

6 Claims, 13 Drawing Sheets

(51) Int. Cl.
  *H02G 1/10*   (2006.01)
  *F16L 5/00*   (2006.01)
  *H01R 13/523* (2006.01)

(56) References Cited

U.S. PATENT DOCUMENTS

| | | | | |
|---|---|---|---|---|
| 9,482,061 B2* | 11/2016 | Latimer | ................ | E21B 17/017 |
| 10,199,808 B2* | 2/2019 | Bang-Andreasen | ..... | H02G 1/10 |
| 10,385,624 B2* | 8/2019 | Duggan | ................ | E21B 17/017 |
| 10,472,900 B2* | 11/2019 | Harbison | ............ | E21B 43/0107 |
| 2003/0145587 A1* | 8/2003 | Christensen | .......... | F03B 13/147 |
| | | | | 60/398 |
| 2011/0226527 A1* | 9/2011 | Ritchie-Bland | ......... | F16L 57/02 |
| | | | | 174/669 |
| 2013/0183853 A1 | 7/2013 | Sivik et al. | | |

FOREIGN PATENT DOCUMENTS

| | | |
|---|---|---|
| WO | 2010/047584 | 4/2010 |
| WO | WO2010/038056 | 4/2010 |
| WO | 2013/050451 | 4/2013 |

OTHER PUBLICATIONS

PCT/EP2017/083703 Written Opinion of the International Preliminary Examining Authority dated Nov. 15, 2018 (7 pages).

* cited by examiner

FOUNDATION INTERFACE DEVICE WITH CATHODE PROTECTION

The present application is a nationalization of and claims priority to PCT/EP2017/083703, filed on Dec. 20, 2017, currently pending, which claims the benefit of the earlier filed U.S. Patent Provisional Application No. 62/437,062, filed on Dec. 21, 2016, now expired.

FIELD OF THE INVENTION

The invention relates to cables and flexibles, in particular to pull-in interface devices through which submarine cables enter an offshore structure.

BACKGROUND

Cables, in particular cables used in the offshore industry, can be extremely long and heavy. The cables must often be pulled from one location to another, requiring great pulling forces up to several tons. The cables must often be protected from the environment and physical impacts, and in certain applications cables are arranged concentrically inside a protective conduit that is pulled along with the cable and secured to a structure. An example of such an application is cables stretched between offshore wind turbines, transformer stations and the like. Another example of such an application is flexibles stretched between offshore production platforms.

In such an application, it is desirable that the conduit be secured to the entry point of the foundation, to ensure that the conduit is not pulled back out of the foundation by the weight of the cable arrangement, by currents or other forces. A prior art solution to this problem is disclosed in EP2329174. As shown therein, a lockable pull-in member is arranged at the end of the conduit. The pull-in member comprises a flexible bend restriction section at its leading end, and a locking segment at its trailing end. The flexible bend restriction section is made of a polymer material, while the locking segment is in the form a rigid, cylindrical steel body with an abutment portion at its base that has a larger diameter than the entry hole. The locking segment further comprises a plurality of biased, spring-loaded fingers spaced a distance forward of the abutment portion. The fingers, being biased in the extended position, spring out to engage the inside of the opening to prevent the conduit from being pulled back out of the structure.

Another example of a foundation pull-in interface is the invention by the present applicant in PCT/EP2017/063695, claiming priority from U.S. 62/347,367 filed Jun. 9, 2016, the entire contents of which is hereby incorporated by reference. As described therein, that application provides a foundation interface device comprising an elongated pull-in member for connection to a leading end of a flexible, elongated cylindrical conduit in which is arranged a cable. The pull-in member has a longitudinal central bore. At the trailing end of the pull-in member, a slidable sleeve is arranged about the circumference of the pull in member. The slidable sleeve is arranged to slide in the longitudinal direction of the pull-in member. The slidable sleeve has an abutment portion at its base, the abutment portion being larger in diameter than the opening of the foundation into which the pull-in device is to be pulled. The slidable sleeve is connected to extendable teeth members at its forward end by a linkage, whereby the longitudinal movement of the sleeve is transferred to a lateral extension of the teeth members, which engage the inside of the opening in the foundation to prevent the interface device from being pulled out.

The offshore foundations into which the above described interface devices are inserted are typically made of metal, for example carbon steel. The teeth or arms of the above described interface devices that engage the inside of the opening are likewise made of metal. Because of the saline environment of the seawater, the metal-to-metal contact between the teeth of the interface and the inside wall of the foundation will cause galvanic corrosion (also called bimetallic corrosion). Since such interface devices often have an expected lifetime of 20 years or more, such galvanic corrosion can weaken the wall area in the vicinity of the opening. Due to the sometimes extreme pulling forces from subsea cables, this can lead to catastrophic failure of the interface device.

SUMMARY OF THE INVENTION

The present invention aims to provide a foundation interface that avoids the problem of galvanic corrosion. According to one aspect, the invention provides a foundation interface device arranged to engage an opening in the wall of an offshore foundation or structure having walls made of a first metal. The interface device has teeth or arms arranged to engage the inside of the opening. The teeth or arms are provided with galvanic protection means.

According to one aspect, the galvanic protection means comprises a non-metallic contact member arranged on the teeth or arms, where the non-metallic member is in contact with the inside of the opening.

In one embodiment, the non-metallic member I made of a ceramic material, such as Aluminium Oxide ($Al_2O_3$) ceramic, for example Frialit® F99.7. Alternative materials include ceramics of Zirconia ($ZrO_2$), Silicon Carbide (SIC), Silicon Nitride ($SI_3N_4$) or Magnesia partially stabilized Zirconia ($ZrO_2$, MgO).

According to one aspect, the ceramic contact member is one or more ceramic balls integrated into the top end of the teeth or arms. According to another aspect, the ceramic contact member is a rod integrated into the top of the teeth or arms. According to yet another aspect, the ceramic contact member is a cap or cover on the top end of the teeth or arms.

In a second embodiment, the non-metallic contact member is made of a rubber, polyurethane, an elastomeric polymer, Epoxy or the like.

In a third embodiment, the entire teeth or arms are made of the non-metallic material.

In a fourth embodiment, the teeth or arms are made of the same metal material as the foundation walls.

According to another aspect, usable with any of the preceding embodiments, the invention provides an elastomeric sheath having flaps that is arranged over the teeth or arms when they are in the retracted position. Flaps are arranged over the teeth or arms, such that when the teeth or arms extend, the flaps will be pushed outward, and become sandwiched between the top of the arms and the inside of the wall opening. This aspect can be either the primary galvanic protection means, or a supplement to one of the preceding embodiments, thereby functioning as a bumper providing additional protection.

In a fifth embodiment, the teeth or arms of the interface device are replaced with a retaining ring, having the non-metallic contact member embedded at intervals around its circumference.

An additional function of the galvanic protection contact member (other than providing an insulation between metals of different galvanic potential) is to serve as a contact point when the loads are high, and the contact surfaces are small, uneven, or of unknown/varying angle. The galvanic protection material will be exposed to high impact forces on small areas. The galvanic protection material can also provide damping and thereby reduce the peak loads.

The mechanical part in which the protection material is installed (for example the retaining teeth or arms), is typically made from high-strength steel. The mechanical part can also (partly or completely) be made of the protection material itself.

The installation of the protection member in the metal part, can be done in several ways. If ceramics balls are used, the seat should have the same shape as the ball to provide good distribution of the loads to the metal part. The ball may be fixed in a corresponding hole using a crimp-collar, welded ring, threaded ring, bolted flange or adhesive. It is important that the direction of the load is on the seat and not on the device fixing the ball to the metal part.

BRIEF DESCRIPTION OF THE DRAWINGS

The invention will be described in detail with reference to the accompanying figures wherein.

DETAILED DESCRIPTION OF THE INVENTION

Figure 1:
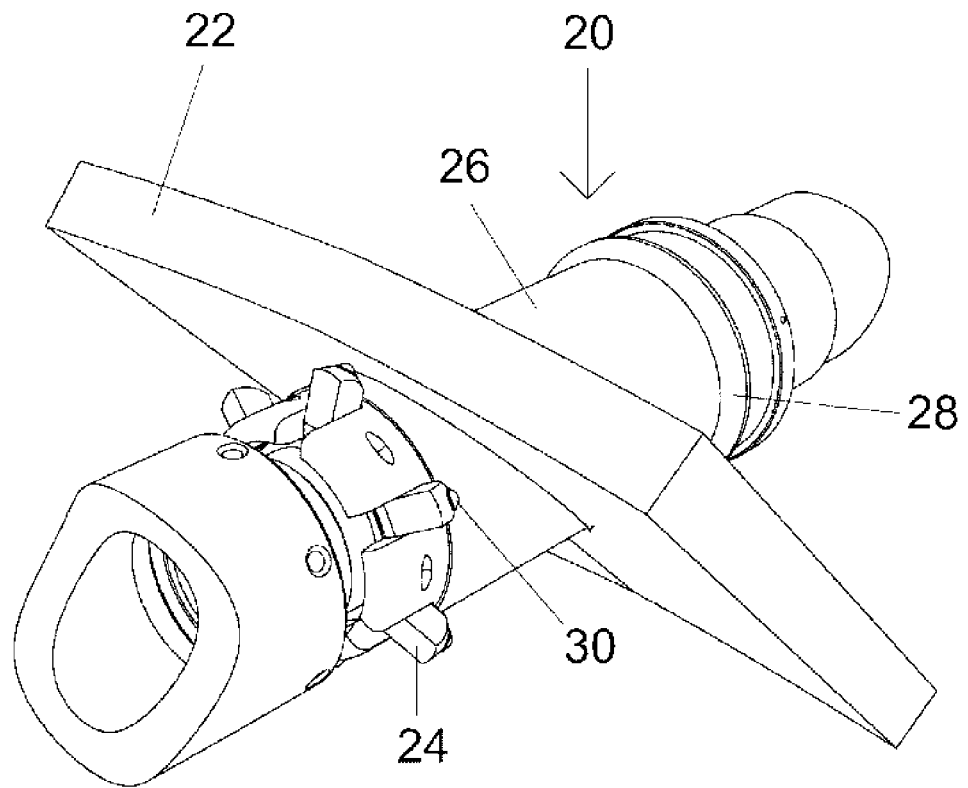
FIG. 1 is a perspective view of an embodiment of the invention having a ceramic ball integrated into the top end of the teeth or arms.

As shown in FIG. 1, the invention according to one aspect provides a foundation interface device 20 arranged to pass through an opening in an underwater wall 22 of a structure. Examples of such structures include, for example, the foundation of an offshore wind turbine, or similar offshore foundation. The interface device is typically used as a pull-in device for entry of a cable into the interior of the structure. Such interface devices have means for engaging the inside wall of opening to prevent to cable form pulling the interface device out of the opening. As shown in FIG. 1, such means may be a plurality of teeth or arms 24 arranged to extend in an outward direction from the typically cylindrical body of the interface device when it is pulled into the opening. In the embodiment shown in FIG. 1, the teeth or arms 24 extend by virtue of a linkage connecting the teeth or arms 24 to a movable sleeve 26. At the trailing end of sleeve 26 is an abutment 28 with a larger diameter than the opening. The interface device is pulled into the foundation until the abutment 26 makes contact with the outer side of wall 22. Further pulling forces cause the teeth or arms 24 to be rotated into their extended position.

As can be seen in FIG. 1, one or more of the teeth or arms 24 will at times be in contact with the interior side of wall 22. Wall 22 is typically made of a first metal, for example carbon steel. The teeth or arms 24 are typically made of a second metal, for example a high-strength steel. Since the two metals are of different material having different galvanic potential, there is a danger of galvanic corrosion between the two. Therefore, the teeth or arms comprise a non-metallic contact member arranged at their ends, positioned such that the non-metallic contact member, rather than the metallic part of the teeth or arms, makes contact with the interior wall.

Figure 2:
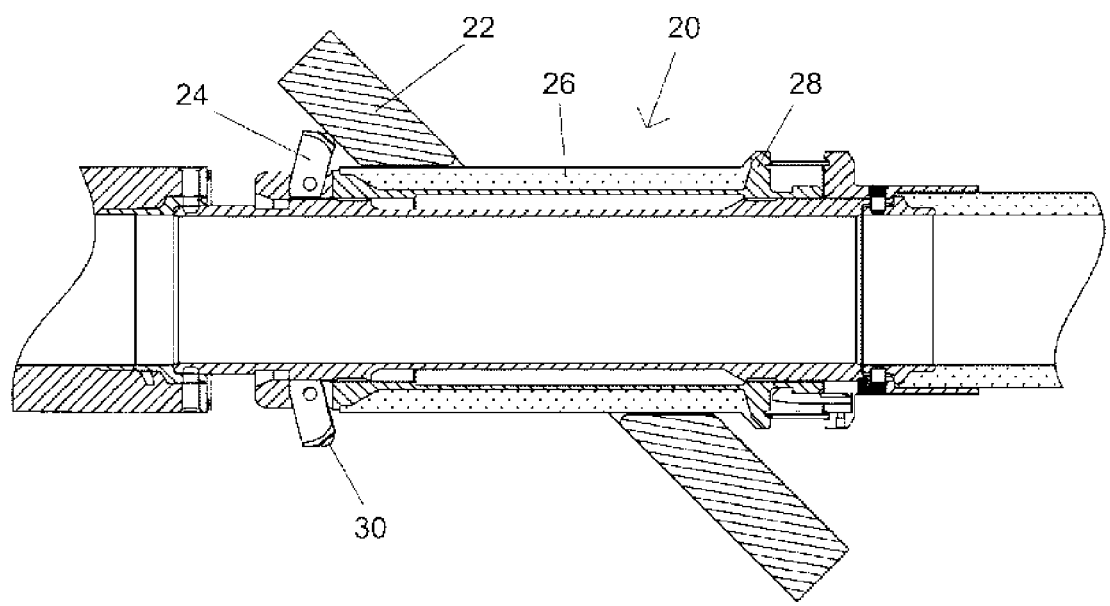
FIG. 2 is a cross sectional view of the embodiment from FIG. 1.
Figure 3:
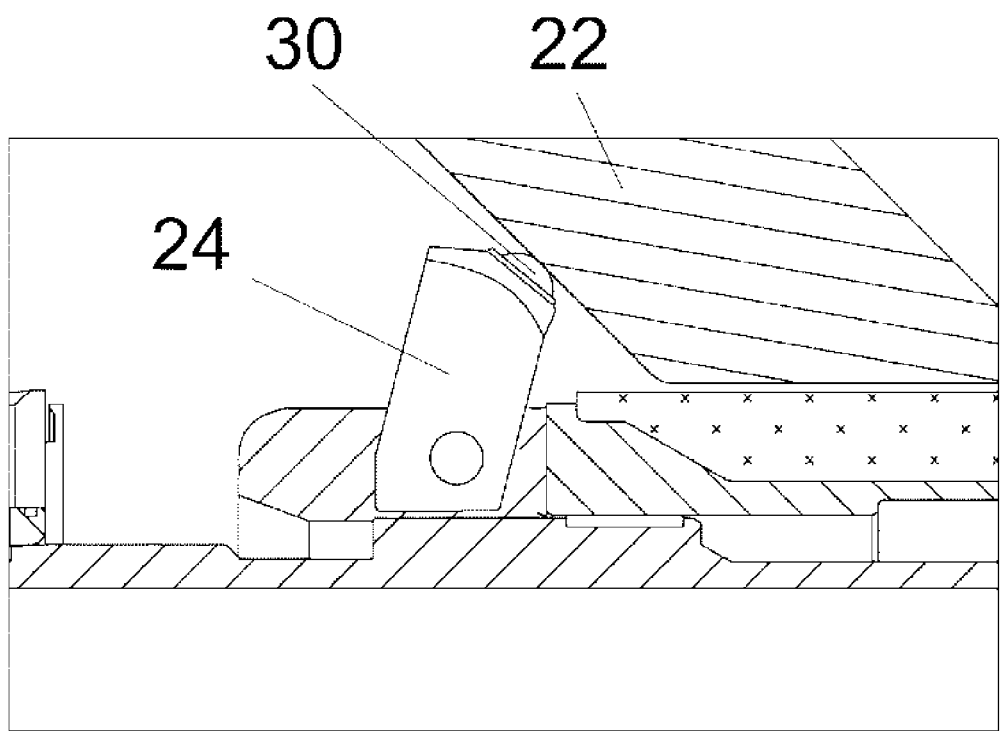
FIG. 3 is a detailed cross section view from FIG. 2.

In the embodiment shown in FIG. 1, the contact member is a ceramic ball 30. FIGS. 2 and 3 illustrates the contact point between ceramic ball 30 and wall 22.

Figure 4:
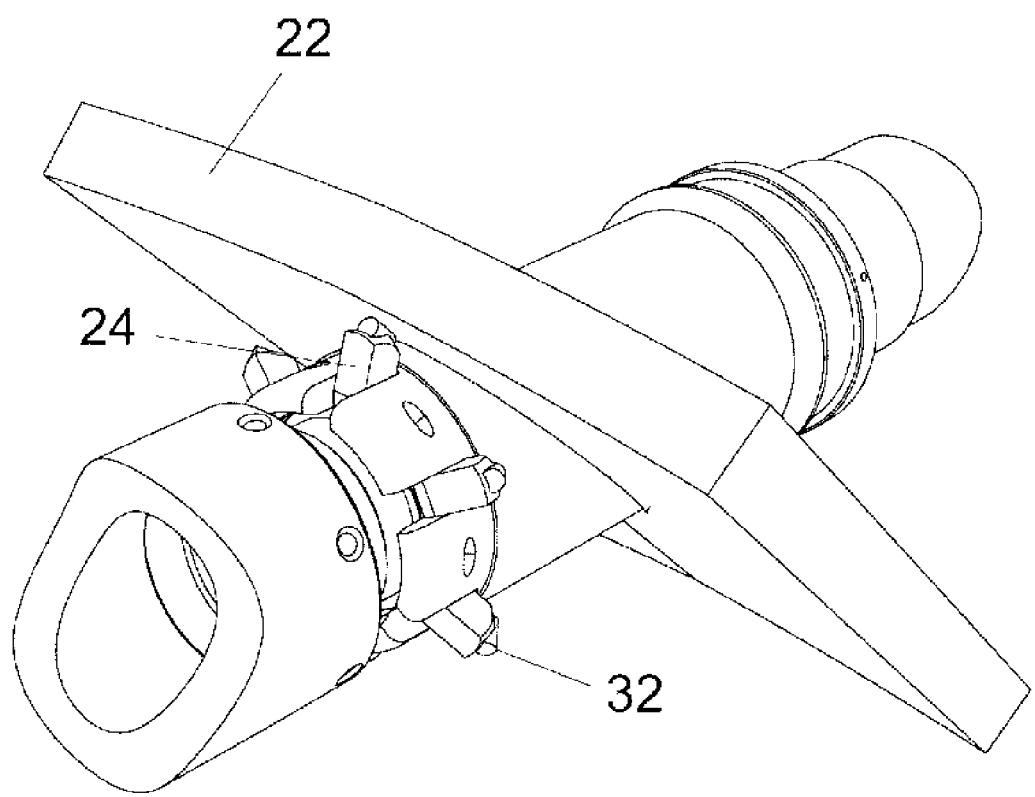
FIG. 4 is detailed perspective view of an alternative embodiment with a ceramic rod integrated into the top end of the teeth or arms.

In the embodiment shown in FIG. 4, the non-metallic contact member is a ceramic rod 32.

Figure 5:
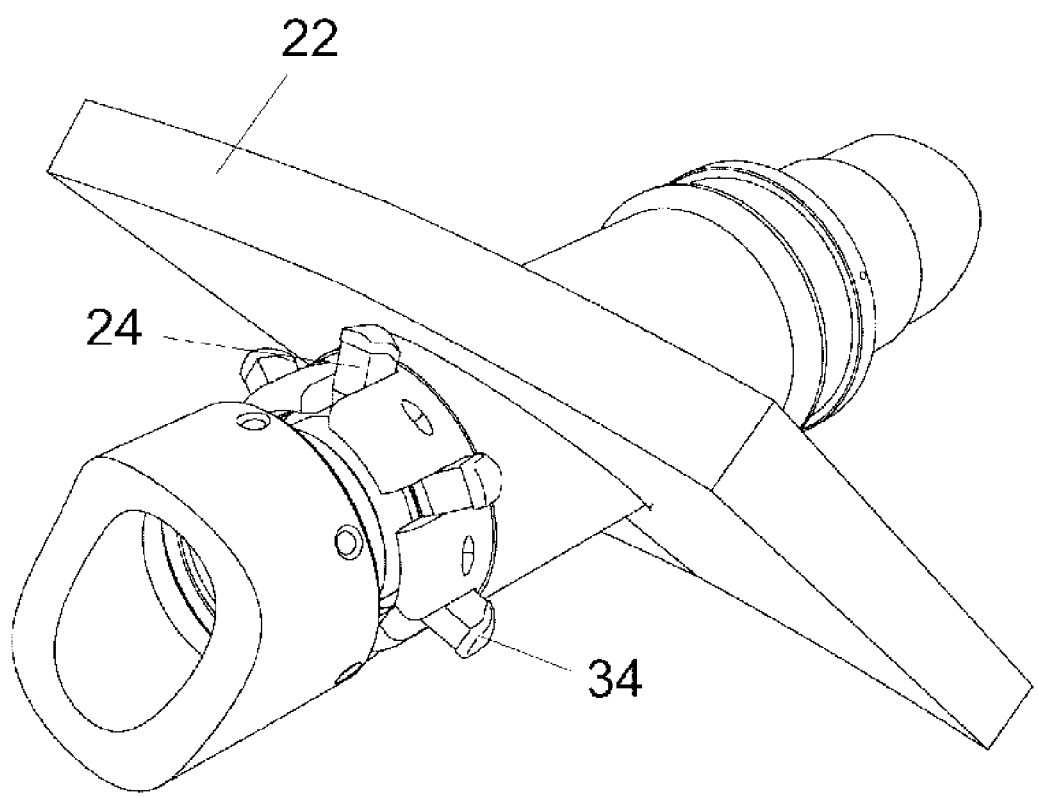
FIG. 5 is detailed perspective view of an alternative embodiment with a ceramic tip or cap integrated onto the top end of the teeth or arms.

In the embodiment shown in FIG. 5, the non-metallic contact member is a cap or tip 34 arranged at the end of teeth or arms 24.

Figure 6:
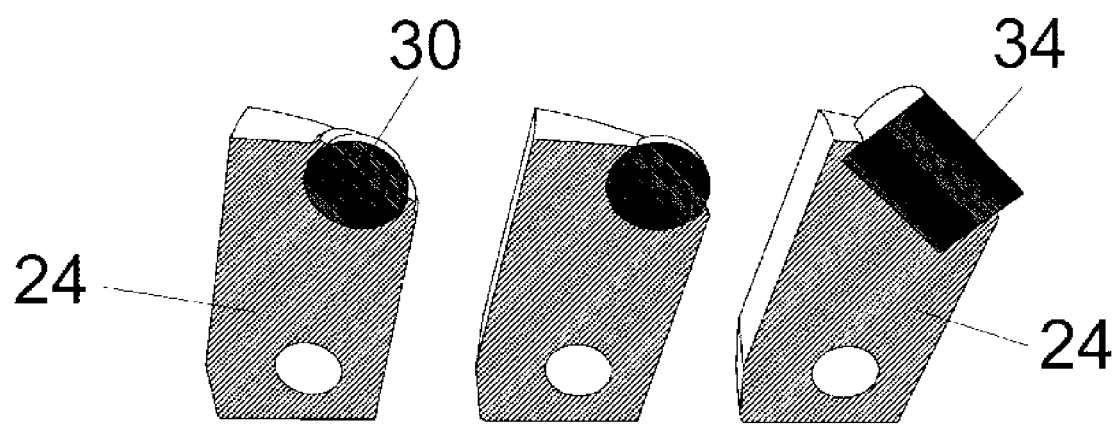
FIG. 6 is a cross section view illustrating the ball or rod integrated into the top end of the teeth or arms.

The ceramic ball 30 or ceramic rod 32 is integrated into the end of arms 24 as shown in FIG. 6. According to one aspect, the ball is arranged in a recess, with the end of the teeth or arms 24 crimped about the ball to hold it in place. Alternatively the ball or rod may be affixed by gluing or other means known in the art.

Figure 7A:
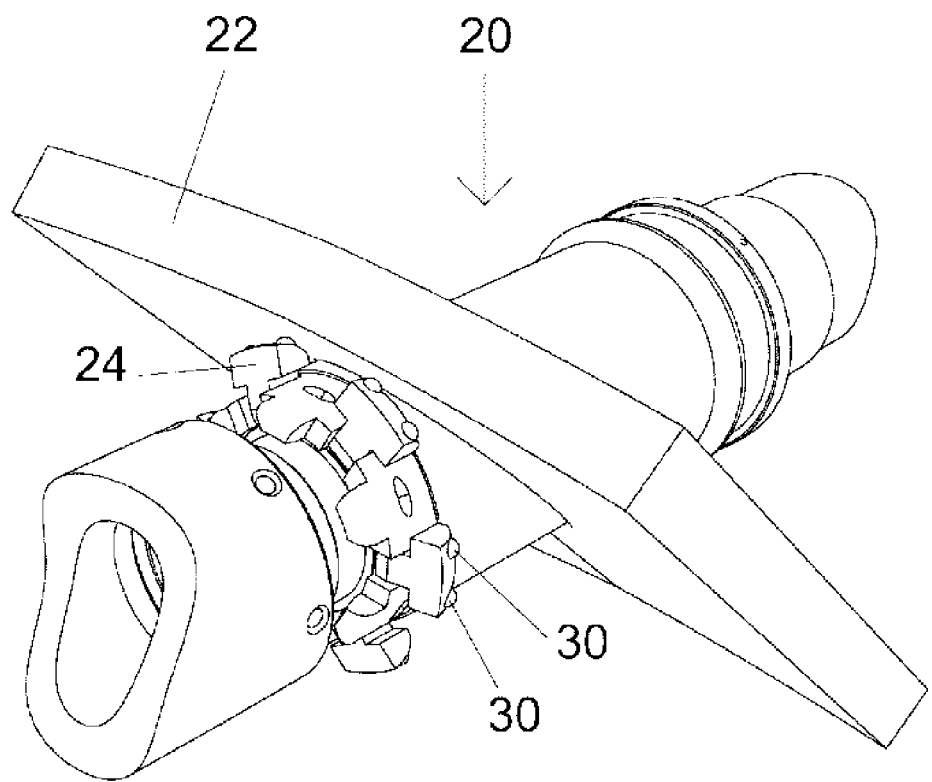
FIGS. 7A and 7B are perspective views of an alternative embodiment with a plurality of ceramic balls integrated into the top end of the teeth or arms.
Figure 7B:
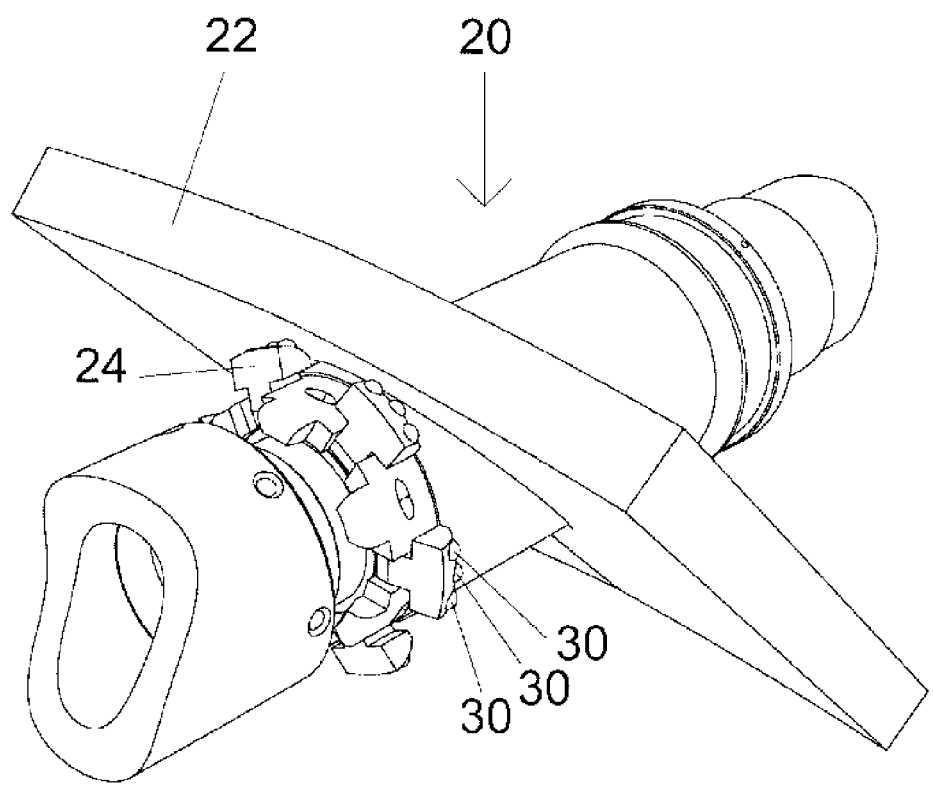

FIGS. 7A and 7B illustrate a plurality of ceramic balls 30 integrated into the ends of teeth or arms 24.

Figure 8A:
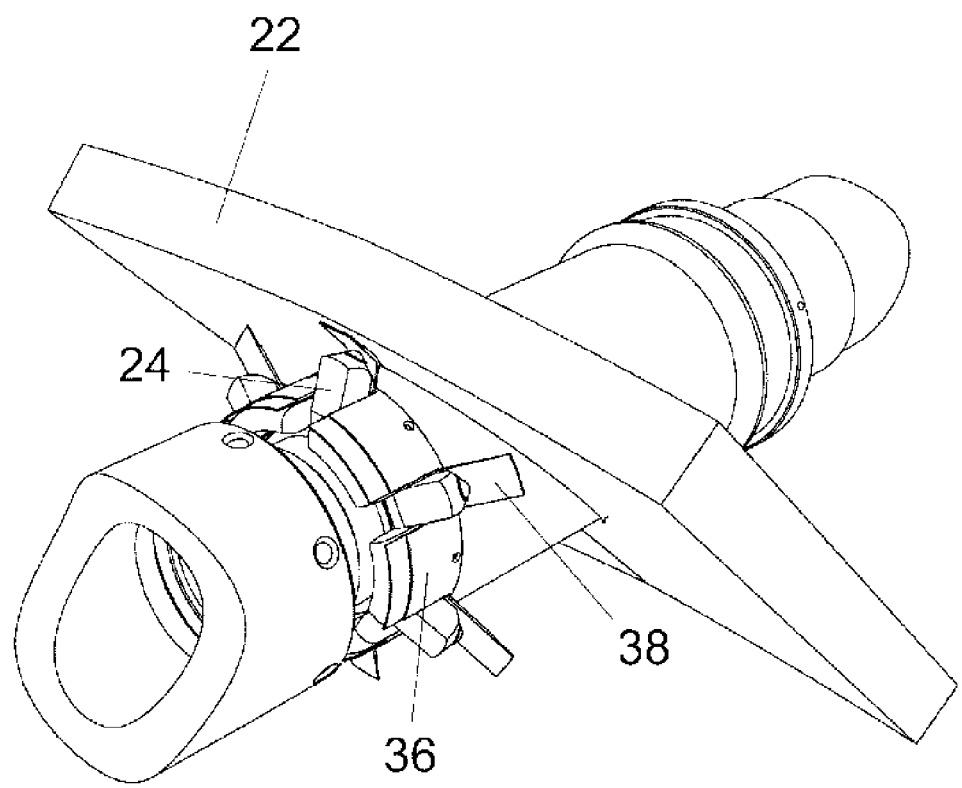
FIGS. 8A and 8B are perspective view showing an elastic sleeve with flaps used with embodiments having and not having a ceramic ball, respectively.
Figure 8B:
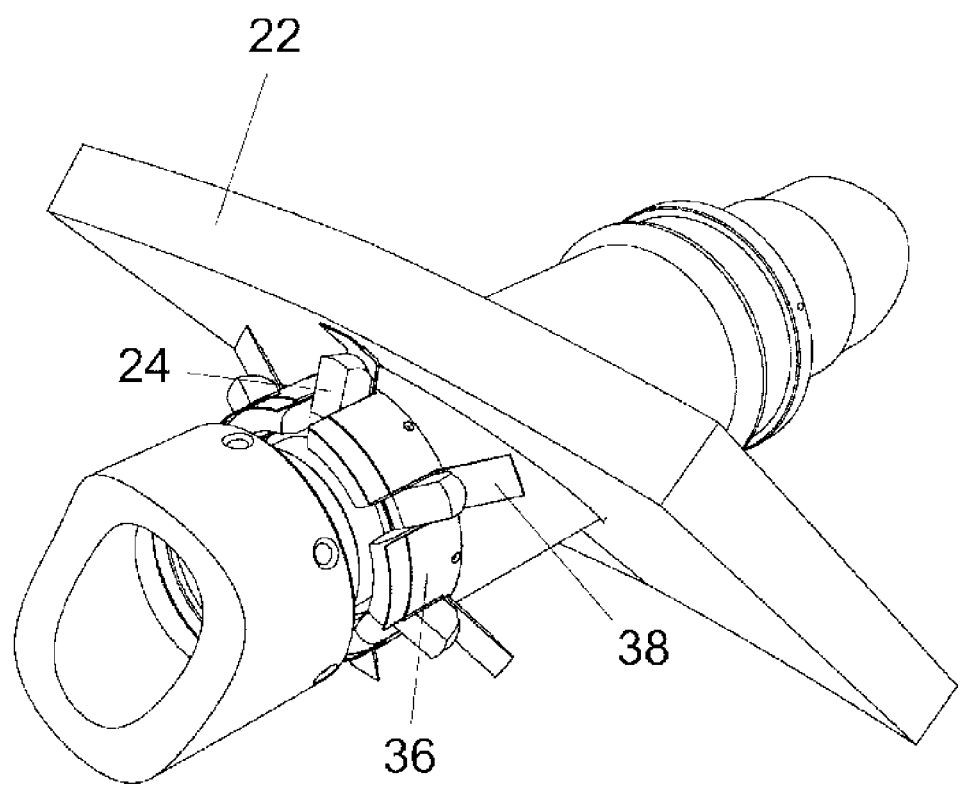

According to one aspect, as shown in FIGS. 8A and 8B, the invention provides a sleeve 36 having a plurality of flaps 38 arranged about the circumference of the interface device, overlapping arms 24. Flaps 38 are positioned above arms 24 when arms 24 are in their retracted position. As can be appreciated from FIGS. 8A and 8B, arms 24 will press flaps 38 upward as the arms extend, sandwiching the flaps between the arms and the inside of wall 22. Sleeve 36 can be employed with embodiments of the invention comprising a contact member, as shown in FIG. 8A, or in embodiments of the invention where arms 24 do not have a contact member, as shown in FIG. 8B. In the latter case, the material of the flaps provide galvanic protection, and in the former case the flaps provide at least a bumper effect protecting or cushioning the contact member.

Figure 9:
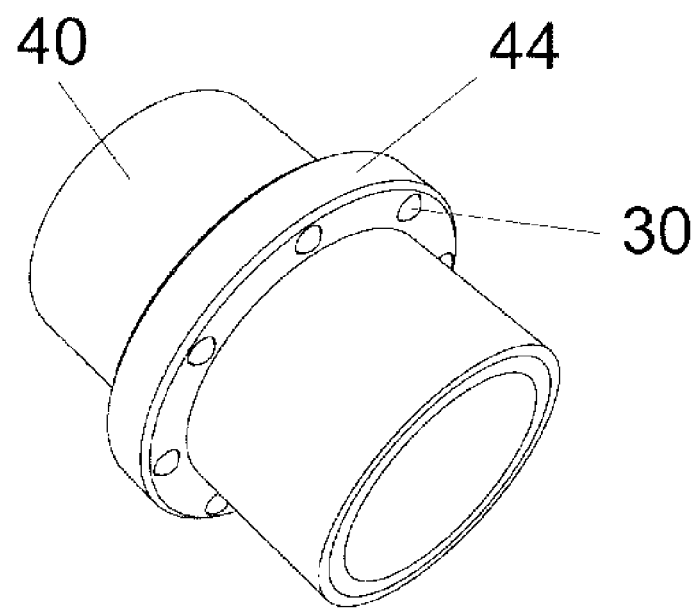
FIG. 9 is a perspective view of an alternative embodiment having a retaining ring with integrated ceramic balls.
Figure 10:
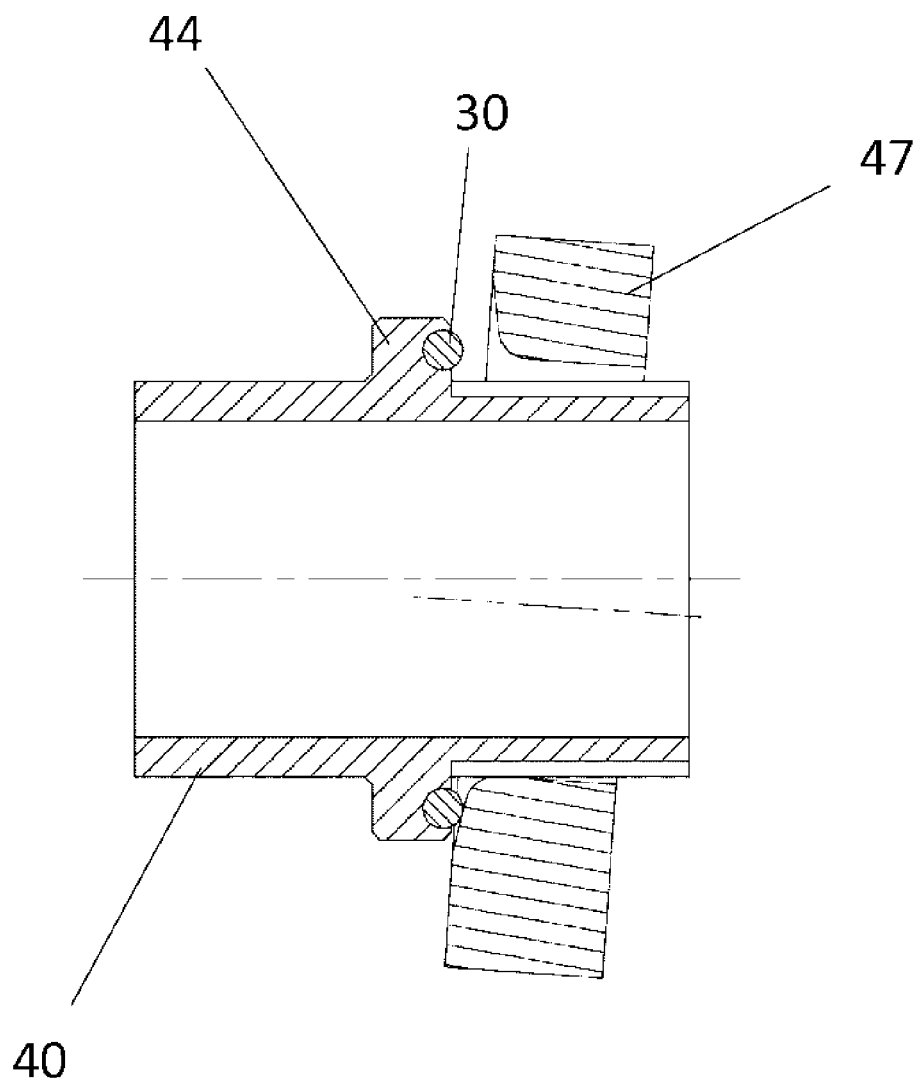
FIG. 10 is a cross-sectional view of the alternative embodiment of FIG. 9 passing through an opening in a metallic member.
Figure 11:
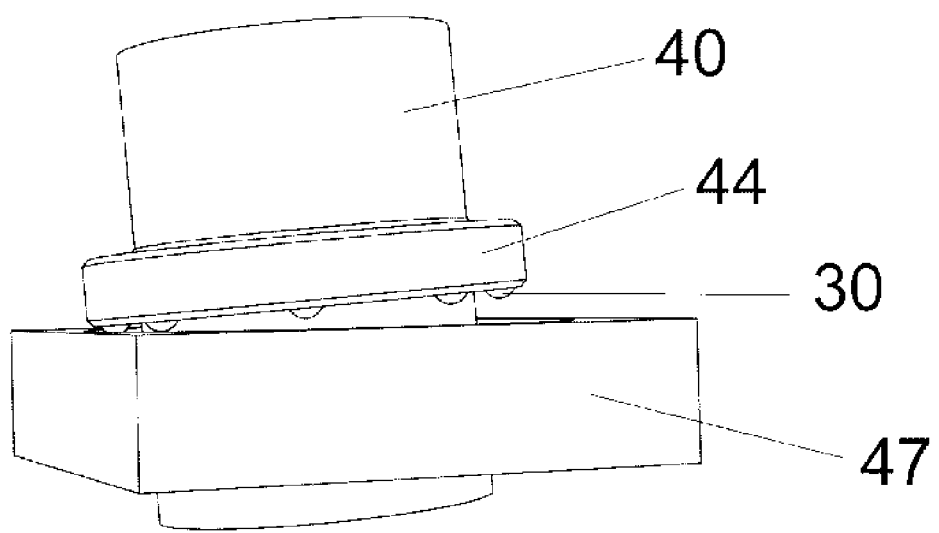
FIG. 11 is a perspective view of the embodiment of FIG. 10.

According to another aspect, the non-metallic contact member may be employed in any situation where a first metallic member comes into contact with a second metallic member. FIGS. 9, 10, and 11 show a cylindrical body 40 passing through an opening in a metallic member 47. A metallic collar 44 affixed to cylindrical body 40 prevent body 40 from being pulled or pushed though member 47. To prevent galvanic corrosion, collar 44 has integrated in its forward facing surface a plurality of ceramic ball 30.

The ceramic material of the contact member s may be any appropriate ceramic material, so long as the material can withstand the forces of a given application. Such ceramic material include Aluminium Oxide ($Al_2O_3$) ceramic, for example Frialit® F99.7. Alternative materials include ceramics of Zirconia (ZrO$_2$), Silicon Carbide (SIC), Silicon Nitride (SI$_3$N$_4$) or Magnesia partially stabilized Zirconia (ZrO$_2$, MgO). Other non-metallic materials can also be employed in given circumstances, for example rubber, polyurethane, an elastomeric polymer, Epoxy or the like. Sleeve 36 can be made of any appropriate flexible material, for example an elastomeric polymer material, plastic, rubber or the like.

What is claimed is:

1. A foundation interface device comprising a cylindrical body arranged to be pulled into an opening in a wall of a subsea foundation, the interface device further comprising one or more extendable arm or teeth arranged to engage an inside portion of wall thereby preventing the interface device from being pulled back out of the opening, characterized in that the retaining member or members comprise one or more ceramic contact members arranged at an end of the arms or teeth and serving as a contact point or points between the retaining member or members at the inside surface of the wall.

2. A foundation interface device according to claim 1, wherein the ceramic contact member is a ceramic ball arranged in a socket at the end of the teeth or arms.

3. A foundation interface device according to claim 1, wherein the ceramic contact member is a ceramic rod.

4. A foundation interface device according to claim 1, wherein the ceramic contact member is a ceramic cap.

5. A foundation interface device according to claim 1, further comprising an elastomeric flexible material arranged over the arms or teeth when said arms or teeth are in a first retracted position, said material configured to be sandwiched between the arms or teeth and the inside surface of the wall when the arms or teeth are in a second, extended position.

6. A foundation interface device according to claim 1, wherein the ceramic contact member is made of Aluminium Oxide (Al2O3) ceramic or ceramics of Zirconia (ZrO2), Silicon Carbide (SIC), Silicon Nitride (SI3N4) or Magnesia partially stabilized Zirconia (ZrO2, MgO).

* * * * *